United States Patent [19]
Cotton

[11] Patent Number: 5,927,065
[45] Date of Patent: Jul. 27, 1999

[54] THERMODYNAMIC CONVERSION SYSTEM USING GAS AND AIR TURBINES

[75] Inventor: John Lee Cotton, Oslo, Norway

[73] Assignee: Kvaerner Energy A.S, Oslo, Norway

[21] Appl. No.: 08/981,965

[22] PCT Filed: Jul. 16, 1996

[86] PCT No.: PCT/NO96/00182

§ 371 Date: Jan. 6, 1998

§ 102(e) Date: Jan. 6, 1998

[87] PCT Pub. No.: WO97/04227

PCT Pub. Date: Feb. 6, 1997

[30] Foreign Application Priority Data

Jul. 17, 1995 [NO] Norway ..................................... 952826

[51] Int. Cl.[6] ............................................................ F02C 6/18
[52] U.S. Cl. ..................................... 60/39.183; 60/39.511
[58] Field of Search ........................... 60/39.181, 39.183, 60/39.511

[56] References Cited

U.S. PATENT DOCUMENTS

| | | | |
|---|---|---|---|
| 2,793,019 | 5/1957 | Baumann | 60/39.183 |
| 4,751,814 | 6/1988 | Farrell | 60/39.183 |

FOREIGN PATENT DOCUMENTS

| | | | |
|---|---|---|---|
| 604028 | 6/1948 | United Kingdom | 60/39.183 |
| 750634 | 6/1956 | United Kingdom | 60/39.183 |

*Primary Examiner*—Louis J. Casaregola
*Attorney, Agent, or Firm*—Young & Thompson

[57] ABSTRACT

In a combined plant including a gas turbine (1) and an air bottoming gas turbine aggregate (2) which includes air compressors (8) and a turbine (9) coupled thereto, wherein the gas turbine outlet gas is in heat exchange with the compressed air from the compressor (8), the gas turbine (1, 6) and the air turbine (9) are provided with mutually rotary dependent torque shafts (10), so that the plant may be controlled by simply controlling the flow of fuel to the gas turbine.

4 Claims, 3 Drawing Sheets

5,927,065

THERMODYNAMIC CONVERSION SYSTEM USING GAS AND AIR TURBINES

FIELD OF THE INVENTION

The present invention relates to thermodynamic conversion apparatus.

BACKGROUND OF THE INVENTION

U.S. Pat. No. 4,751,814 discloses an air cycle thermodynamic conversion system including a gas turbine providing a flow of heated gases from the gas turbine exhaust; at least one air compressor for compressing ambient air; a heat exchanger including means for transferring heat from said flow of heated gas turbine exhaust gases to a compressed air from said air compressor to produce a heated compressed air; at least one air turbine connected to the heat exchanger responsive to said heated compressed air to drive said at least one compressor; said heated compressed air including an excess of energy beyond that required by said at least one air turbine to drive said at least one air compressor; and, means for delivering said excess of energy to a using process. By establishing the heated exhaust gas and the compressed air flow in the heat exchanger such that they both have about equal heat capacities, a minimum temperature gradient is maintained between them. The use of compressed air provides an air bottoming cycle.

The control of this known system requires control valves to regulate the flow rate of heated air, and its temperature, to the air turbine in order to regulate the power developed in the air turbine. This requires control valves of large dimensions and the control system is a slow working system. Thus no practicable control has been available up to-day. I have now discovered that a desired rapid and convenient control may be provided by establishing mutually rotary dependent torque axes of the gas turbine and the air turbine. This new arrangement makes it possible to control the system by only controlling the gas turbine, i.e. by controlling the fuel flow to the combustion chamber of the gas turbine. Control of fuel flow to the combustion chamber results in a rapid change of the gas turbine performance and of the total apparatus, due to the dependency of the torque axes of the gas turbine and the air turbine. This rapid control of power output from the gas turbine also compensates for the slow-reacting air bottoming cycle due to the large thermal inertia in the heat exchanger.

SUMMARY OF THE INVENTION

Accordingly, it is an object of the invention to provide a thermodynamic conversion system including a gas turbine and which employs an air bottoming cycle for recovering heat energy in a useful form from a stream of heated gas.

It is a further object of the invention to provide a control means for a such thermodynamic conversion system.

A still further object of the invention is to provide a thermodynamic conversion system including a gas turbine and an air bottoming apparatus including an air turbine which system is controllable by controlling the gas turbine.

Briefly stated, the present invention provides a thermodynamic conversion system including a gas turbine providing a flow of heated gases from the gas turbine exhaust, at least one air compressor for compressing ambient air; a heat exchanger including means for transferring heat from said flow of heated gas turbine exhaust gases to a compressed air from said air compressor to produce a heated compressed air; at least one air turbine connected to the heat exchanger responsive to said heated compressed air to drive said at least one compressor; said heated compressed air including an excess of energy beyond that required by said at least one air turbine to drive said at least one air compressor; and a controlling means controlling the energy supply to the gas turbine, said gas turbine and said air turbine having mutually rotary dependent torque axes, so that said controlling of the energy supply to the gas turbine results in simultaneously control of the air turbine and the air compressor.

BRIEF DESCRIPTION OF THE DRAWINGS

The above, and other objects, features and advantages of the present invention will become apparent from the following description read in conjunction with the accompanying drawings, in which like reference numerals designate the same elements.

DESCRIPTION OF THE PREFERRED EMBODIMENTS

Figure 1:
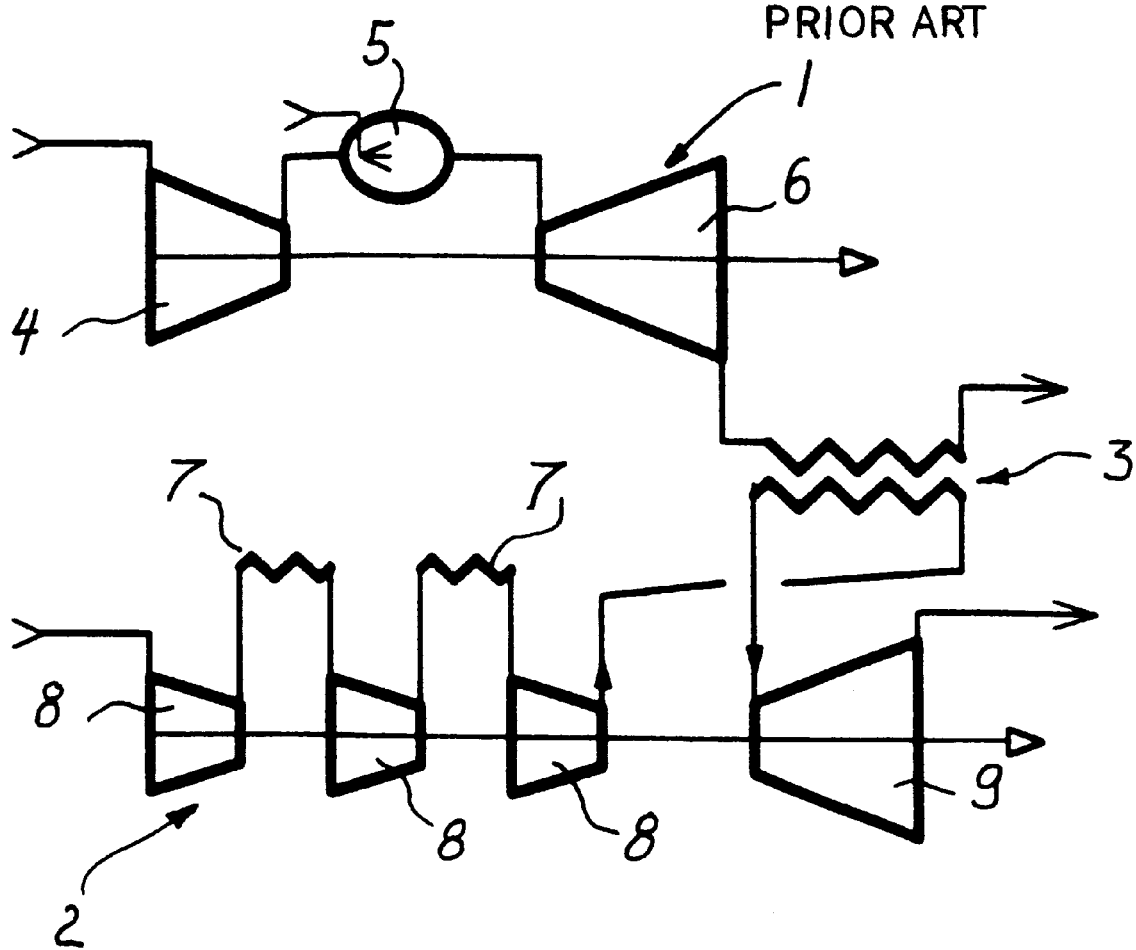
FIG. 1 is a schematic diagram of a thermodynamic conversion system according to the prior art.

Referring to FIG. 1, there is shown a thermodynamic conversion system according to the prior art and including a parent gas turbine 1, an air bottoming cycle gas turbine 2 and a counterflow heat exchanger 3. The parent gas turbine comprises a compressor 4, a combustion chamber 5, and a turbine 6. The air bottoming cycle gas turbine 2 comprises a series of through intercoolers 7 connected air compressors 8 and an air turbine 9. The compressed air from the compressors 8 flows to the heat exchanger 3 and from there to the air turbine 9. Exhaust gases from the gas turbine 6 flow to the heat exchanger 3 for counterflow heat exchange with the compressed air from the air compressors 8. This known thermodynamic conversion apparatus is controlled by controlling the heat exchanger, as disclosed in U.S. Pat. No. 4,751,814, the content of which is hereby enclosed by reference.

According to this prior art it is known to combine 8 turbine and an air compressor/turbine combination using exchange between gas turbine exhaust gases and compressed air to provide useful shaft power or process heat.

Application of the air bottoming cycle may be where the load on both the parent gas turbine and the air bottoming cycle gas turbine may vary, for example on an offshore oil and gas production facility. In such an application it is important for the operator that a minimum amount of control, either active or passive, is required. The way the parent gas turbine and the air bottoming cycle gas turbine are configured together according to the invention has a significant influence on ease of control and operability.

In the following illustrations and descriptions (FIGS. 2–9), it is the way in which the parent gas turbine and the air bottoming cycle gas turbine are arranged which is of significance.

The air bottoming cycle gas turbine is therefore shown simplified in the compressor section. It is to be understood that all configurations may include multiple compressors with intercooling.

Also for simplicity, the heat exchanger with interconnection is not shown completely. All configurations will also include these, as disclosed in FIG. 1.

Figure 2:
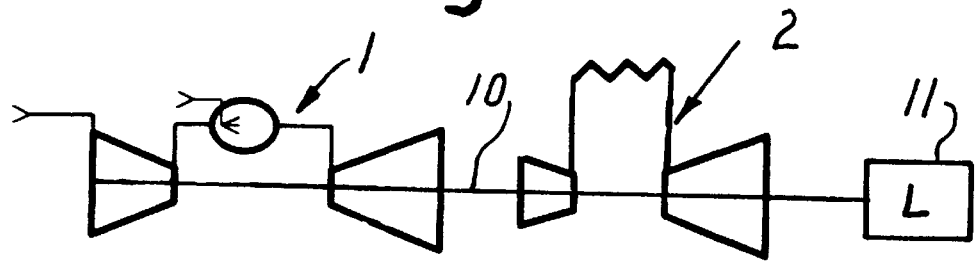
FIG. 2 is a schematic diagram of a first possible thermodynamic conversion system according to the invention.

FIG. 2 shows the simplest combined configuration according to the invention, a single shaft parent gas turbine 1 directly coupled to a single shaft air bottoming cycle gas turbine 2, the shaft 10 being represented by the so nominated line. The load is represented by the square 11 (The letter L =load).

If the parent gas turbine -PGT- has a shaft out of both ends of the machine, the PGT can be between the air bottoming cycle gas turbine -ABCGT- and the load -L-.

The configuration in FIG. 2 is ideal for driving an electrical generator or an other constant (and single) speed load device.

The control method is identical with that of a normal single shaft gas turbine, including upset conditions.

Figure 3:
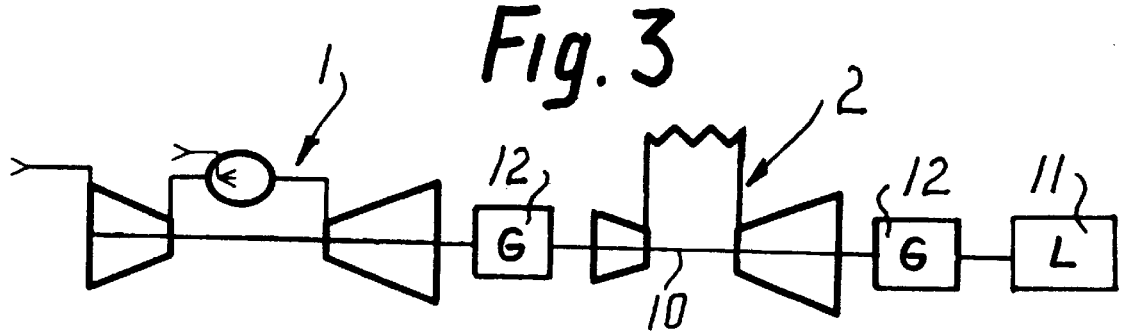
FIGS. 3–9 disclose schematic diagrams of a second to an eighth possible thermodynamic conversion system according to the invention.

FIG. 3 shows a configuration as in FIG. 2, the only difference being the insertion of gears 12 between the PGT and the ABCGT and the load L, respectively. These gears may be included to enable differing speeds to be matched. This may be because the PGT and ABCGT naturally have different operational rotational speeds, or because forcing different speeds can achieve different performance characteristics which may be desirable.

Figure 4:
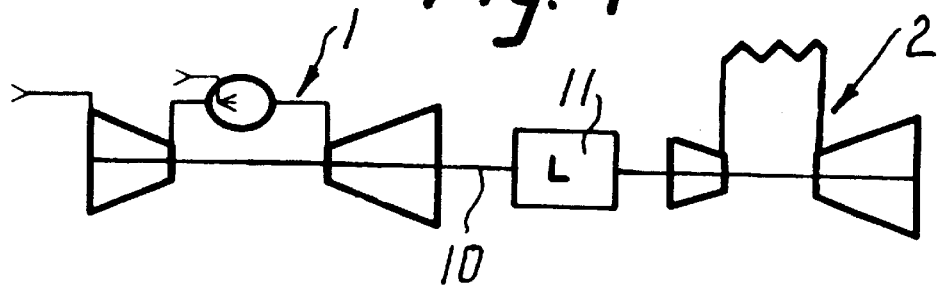

FIG. 4 shows a single shaft PGT coupled to one end of the load L and a single shaft ABCGT coupled to the other end. This configuration can give flexibility in installation of the air intakes, exhausts and heat exchanges.

Figure 5:
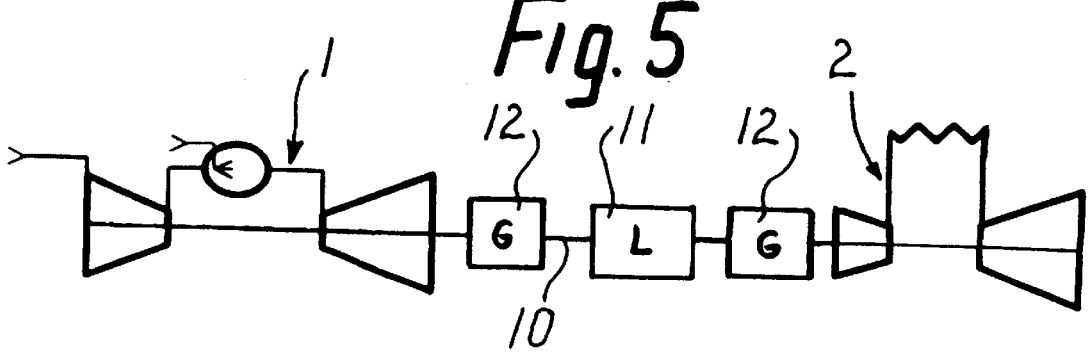

FIG. 5 shows the same configuration as in FIG. 4, the difference being the use of gears 12 between PGT 1, the load L 11 and the ABCGT 2, respectively.

Figure 6:
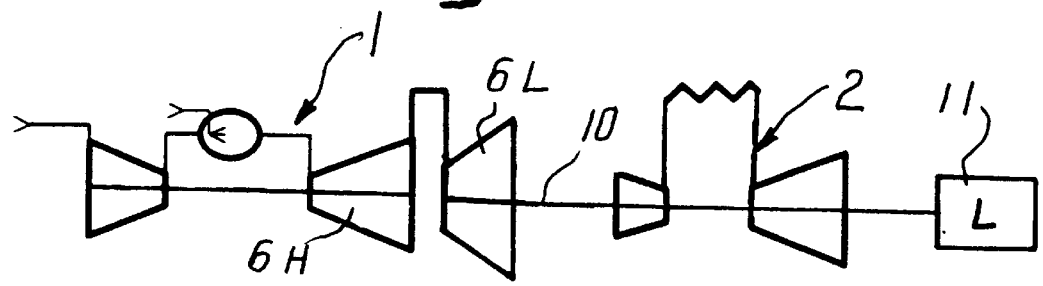

FIG. 6 is a configuration similar to FIG. 2, but with a two shaft PGT (high and low pressure turbines 6H and 6L).

Figure 7:
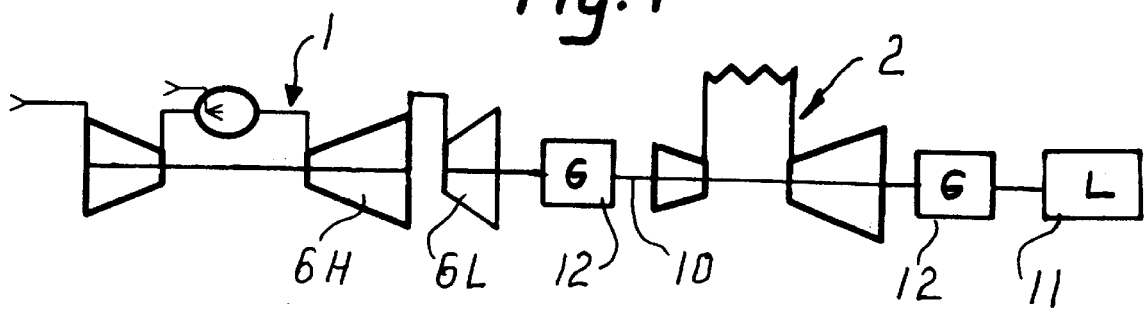
Figure 8:
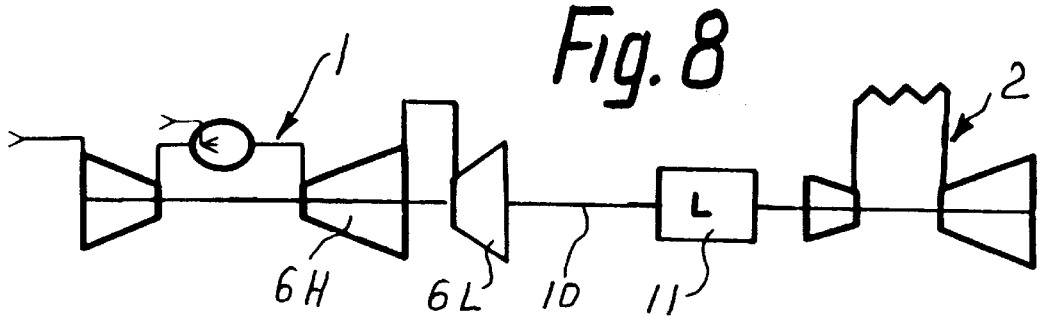
Figure 9:
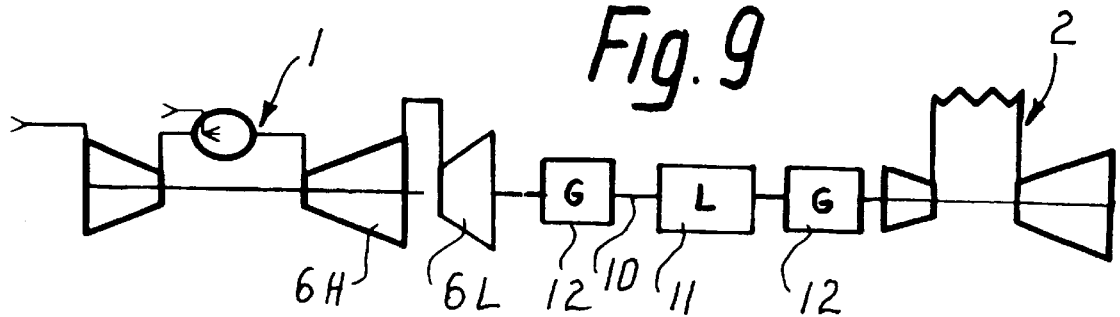

Correspondingly FIGS. 7, 8, and 9 show a configuration similar to FIGS. 2, 4, and 5 respectively, with a two shaft PGT.

Without being shown in the figures, in addition and similarly to any or all of the above configurations, multiple PGTs could be coupled to one ABCGT. Also, multiple ABCGTs could be coupled to one PGT.

I claim:

1. A thermodynamic conversion system comprising:
   a gas turbine providing a flow of heated gases from the gas turbine exhaust;
   at least one air compressor for compressing ambient air;
   a heat exchanger including means for transferring heat from said flow of heated gas turbine exhaust gases to compressed air from said air compressor to produce heated compressed air;
   at least one air turbine connected to the heat exchanger responsive to said heated compressed air said at least one compressor, said heated compressed air including an excess of energy beyond that required by said at least one air turbine to drive said at least one air compressor;
   at least one of said air compressor and said air turbine being operatively connected to a load; and
   said gas turbine and said air turbine having mutually rotary dependent torque shafts extending along a common axis whereby energy supplied to the gas turbine results in simultaneous control of said air turbine and said air compressor.

2. The thermodynamic conversion system according to claim 1, further comprising a gear connection between said shafts of said gas turbine and said air turbine.

3. A thermodynamic conversion system comprising:
   a gas turbine providing a flow of heated gases from the gas turbine exhaust;
   a combustion chamber directly connected to said gas turbine;
   at least one air compressor for compressing ambient air;
   a heat exchanger including means for transferring heat from said flow of heated gas turbine exhaust gases to compressed air from said air compressor to produce a heated compressed air;
   at least one air turbine connected to the heat exchanger responsive to said heated compressed air to drive said at least one compressor, said heated compressed air including an excess of energy beyond that required by said at least one air turbine to drive said at least one air compressor;
   at least one of said air compressor and said air turbine being operatively connected to a load; and
   said gas turbine and said air turbine having mutually rotary dependent torque shafts extending along a common axis whereby energy supplied to the gas turbine results in simultaneous control of said air turbine and said air compressor.

4. The thermodynamic conversion system according to claim 3, further comprising a gear connection between said shafts of said gas turbine and said air turbine.

* * * * *